United States Patent [19]

Hosoya

[11] Patent Number: 4,800,437

[45] Date of Patent: Jan. 24, 1989

[54] IMAGE PHOTOGRAPHY APPARATUS HAVING SWITCH IN REMOTE CONTROL CABLE FOR PREVENTING ERRONEOUS PHOTOGRAPHY

[75] Inventor: Takamasa Hosoya, Tokyo, Japan

[73] Assignee: Olympus Optical Co., Ltd., Tokyo, Japan

[21] Appl. No.: 907,833

[22] Filed: Sep. 16, 1986

[30] Foreign Application Priority Data

Sep. 30, 1985 [JP] Japan ............................ 60-149128[U]

[51] Int. Cl.$^4$ ........................... H04N 5/84; G03B 1/00
[52] U.S. Cl. ..................................... 358/244; 354/76; 346/110 R
[58] Field of Search ....................... 358/332, 345, 244; 354/76; 346/110 R

[56] References Cited

U.S. PATENT DOCUMENTS 3,118,360  1/1964  Marjoram .
4,629,300  12/1986  Akimoto et al. ...................... 354/76

FOREIGN PATENT DOCUMENTS 60-27906  2/1985  Japan .

Primary Examiner—Robert L. Richardson
Attorney, Agent, or Firm—Frishauf, Holtz, Goodman & Woodward

[57] ABSTRACT

Disclosed is a construction for an image photography apparatus. The image photography apparatus is used for photographing the image on a TV monitor which is connected to an endoscope having a solid-state image sensor. The image photography apparatus comprises a substantially box-shaped casing, a TV monitor received in the casing, a camera detachably coupled to the casing and having a pair of remote control cables that permit the camera to photograph the image on the TV screen under remote control, and a switch means which has a switch contact inserted in series with one of the remote control cables and opens or closes the switch contact in response to the on/off operation of the power supply of the TV monitor.

13 Claims, 8 Drawing Sheets

IMAGE PHOTOGRAPHY APPARATUS HAVING SWITCH IN REMOTE CONTROL CABLE FOR PREVENTING ERRONEOUS PHOTOGRAPHY

BACKGROUND OF THE INVENTION

The present invention relates to an image photography apparatus for photographing the image on a TV monitor connected to an endoscope having a solid-state image sensor.

An endoscope is well known wherein a solid-state image sensor, such as a CCD and an SID, is provided at the distal end, and the data on a coeliac image is converted into electrical signals for output. This type of endoscope is called an electronic scope, in which an image signal from the solid-state image sensor is processed in an image processing unit to convert it into a video signal and this video signal is supplied to a TV monitor to display the image represented by the video signal.

With the above electronic scope, however, the operator can only observe the image on the TV monitor. It is impossible for him to photograph the image on the TV monitor by a still camera, even if he wants to do so.

Japanese Utility Model Disclosure (Kokai) No. 60-27906 discloses a supersonic diagnosis apparatus which uses a conventional technique for photographing the image of a TV monitor. In this apparatus, however, a camera is coupled directly onto the TV monitor, so that the camera becomes an obstacle when the operator observes the image on the monitor.

Japanese Patent Application No. 60-151701 discloses a monitor image-photographing apparatus which enables the operator both to easily observe the image on the monitor at a normal time and to easily take still photographs of the image as occasion demands.

The monitor image-photographing apparatus disclosed in Japanese Patent Application No. 60-151701 comprises a box casing which is divisible into two sections. A TV monitor is received in one of the sections, and a mount for mounting an automatic camera or a remote control camera is provided for the other. With this construction, when the two sections of the casing are coupled together, it is possible to photograph the image on the TV monitor. When the two sections are separated from each other, the operator can freely observe the image without being obstructed by the camera.

However, this monitor image-photographing apparatus is faced with a problem if it uses the remote control camera. When this type of camera is used, the motor drive unit and photography controller (or remote controller) of the camera are connected to each other by means of a remote cable, and the shutter release of the camera is operated by use of the photography controller. This means that the control system of the camera and that of the TV monitor function independently of each other. Due to this construction, the shutter of the camera may be released even if the TV monitor is off.

It should be noted that the TV monitor is surrounded by the casing. Due to this construction, it is difficult to know whether the TV monitor is on or off from outside the casing. Therefore, a mistake may be made when photographing the image on the TV monitor.

SUMMARY OF THE INVENTION

The object of the present invention is to provide an image photography apparatus for use with a TV monitor, which reliably prevents the shutter of a monitor image-photographing camera from being released while the TV monitor is off.

This object is achieved by an image photography apparatus comprising:
a casing which is shaped substantially like a box;
a TV monitor received in the casing;
a camera detachably secured to the casing and having a pair of remote control cables by means of which the image on the TV monitor can be photographed by remote control; and
switch means, including a switch contact inserted in series with one of the remote control cables, for opening/closing the switch contact in response to on/off operation of the TV monitor.

BRIEF DESCRIPTION OF THE DRAWINGS

FIG. 1 is a partially-cutaway perspective view showing an image photography apparatus for use with a TV monitor;

FIG. 2 is a perspective view showing the outward appearance of the image photography apparatus from which a camera is removed;

FIG. 3 is a longitudinal section of the neighborhood of the switch means;

FIG. 4 is a cross section of the neighborhood of the switch means, taken along line A—A in FIG. 3; and FIG. 5 is a partially-sectional view of the joint between the camera and the upper cover.

DETAILED DESCRIPTION OF THE PREFERRED EMBODIMENTS

A description may now be given of embodiments of the present invention with reference to the accompanying drawings.

Figure 1:
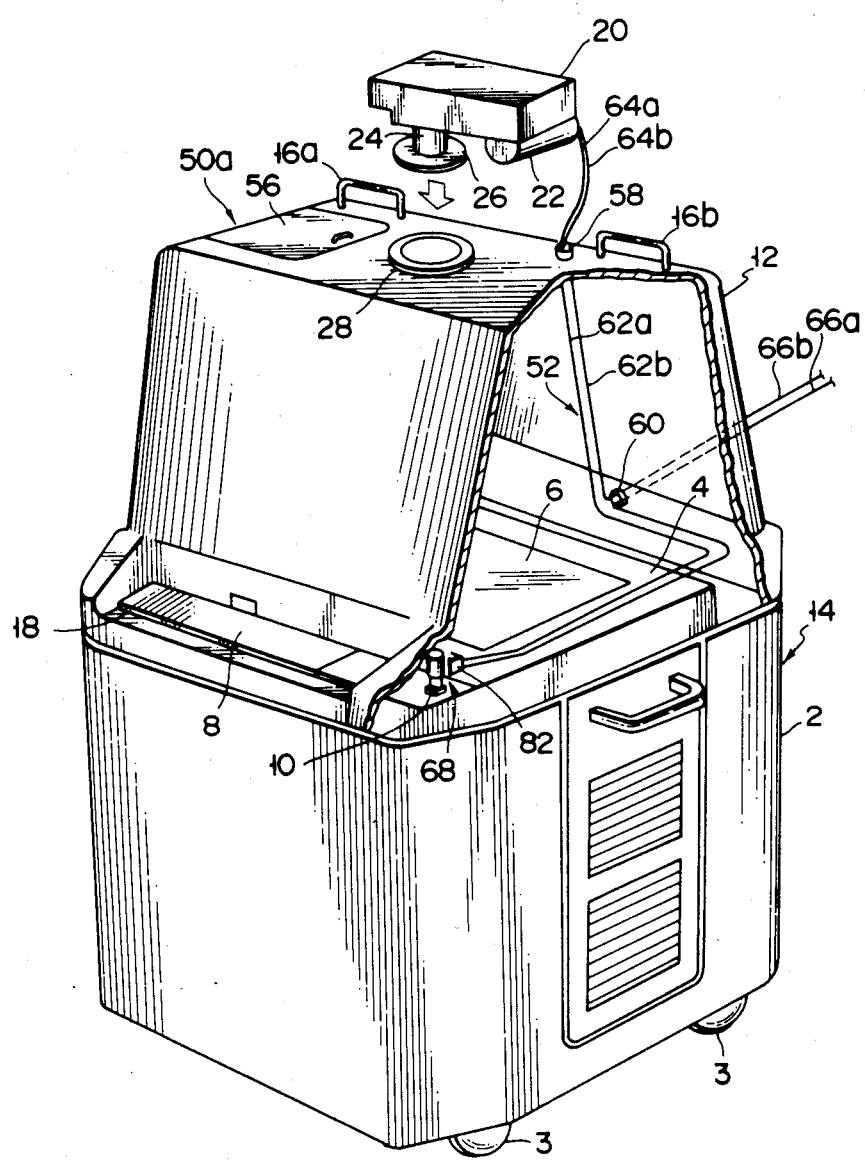
FIGS. 1-5 illustrate one embodiment of the present invention.
Figure 2:
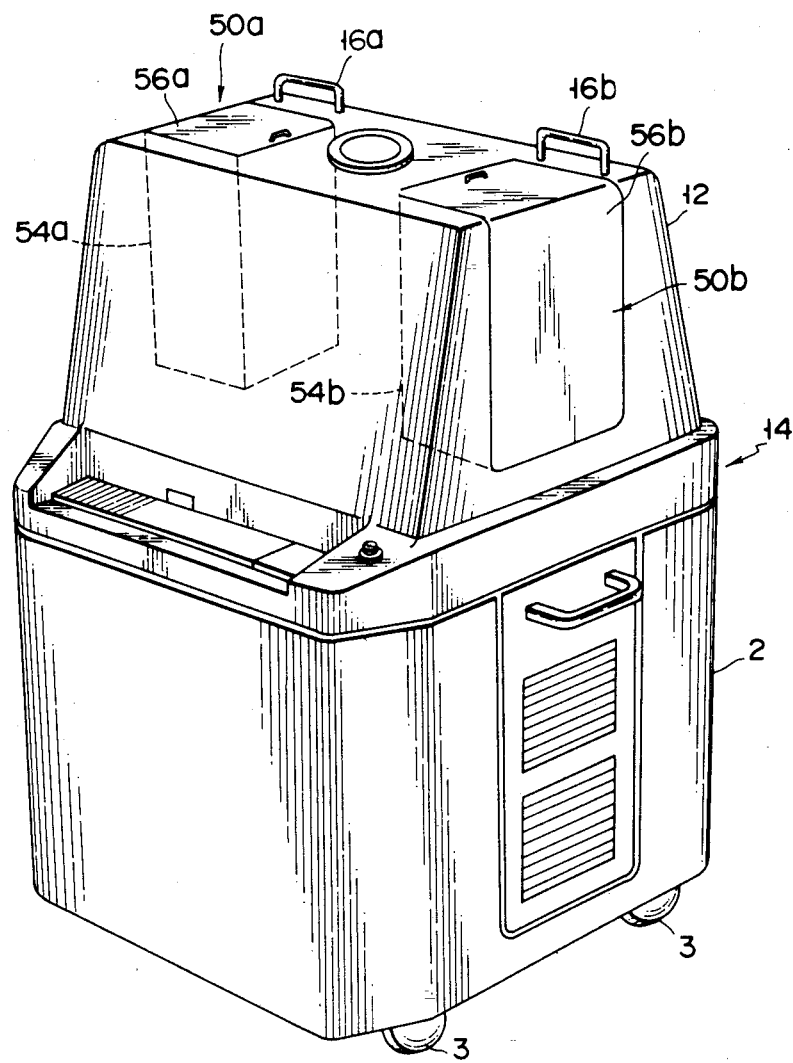

FIG. 2 illustrates the whole of an image photography apparatus for a TV monitor, and FIG. 1 illustrates the same image photography apparatus part of which is cut away. Lower cover 2 is shaped substantially like a box and has casters 3 at its bottom. TV monitor 4, which has screen 6 on the upper surface, is received in lower cover 2. TV monitor 4 is provided with an operating panel (not shown) located in the neighborhood of screen 6. TV monitor 4 is operated, using the operating panel. Plate cover 8, which can be opened or closed, is provided for the operating panel. Power switch 10 is located at one end portion of operating panel. TV monitor 4 is turned on by depressing switch 10 once and turned off by depressing switch 10 again. The signal line and power supply cord (neither is shown) of TV monitor 4 are led through the wall of lower cover 2 to the outside of the apparatus. The signal line is connected to the solid-state image sensor (not shown) of an endoscope via an image processing unit (not shown). To the end of the power supply cord, a plug (not shown) is attached, with which the power supply cord is connectable to the power supply receptacle. With the above construction, an image detected by the solid state image sensor is displayed on screen 6 of TV monitor 4.

Figure 5:
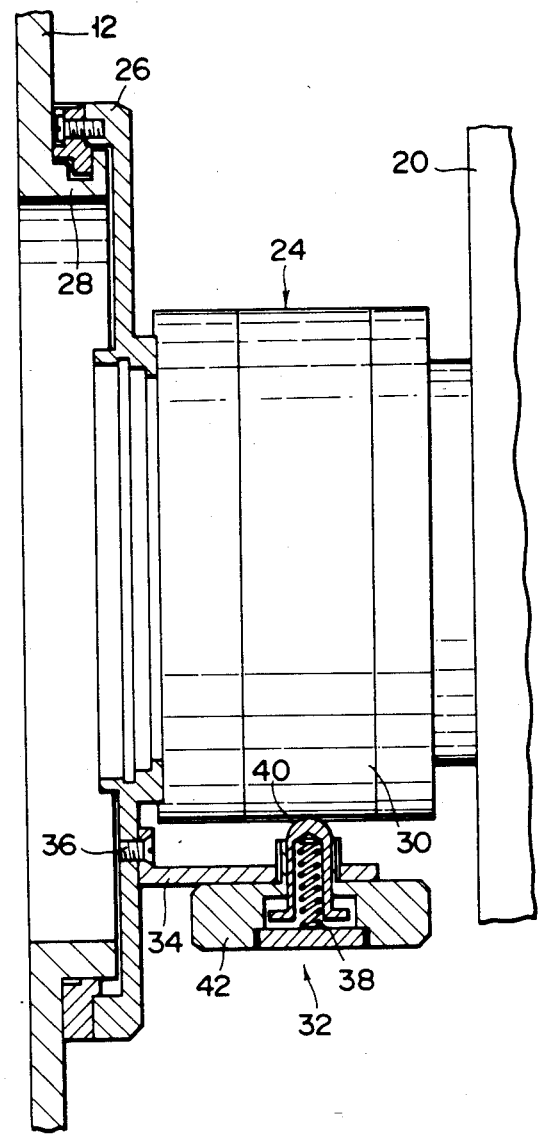

Upper cover (hood) 12 is shaped substantially like a box. Upper cover 12 is normally coupled to lower cover 2 such that their openings conform in location, but is detachable from lower cover 2. Upper cover 12 covers screen 6 of TV monitor 4, thus shielding the outside light which may fall upon screen 6. Upper and lower covers 12 and 2 are coupled together preferably by buckles (not shown) such that they constitute casing 14 divisible into two sections. On the upper wall of upper cover 12, there are provided a pair of handles 16a and 16b, which are used when removing upper cover 12 from lower cover 2. If upper cover 12 is removed from lower cover 2, screen 6 of TV monitor 4 is exposed, permitting the user to observe the image on screen 6. As shown in FIGS. 1 and 2, window 18 is provided at the lower portion of the front of upper cover 12. Plate cover 8 of the operating panel is located within the region of window 18, so that plate cover 8 is exposed to the outside of the apparatus. Therefore, even when upper cover 12 is coupled to lower cover 2, the operating panel can be operated if only plate cover 8 is opened. Camera 20 is fitted to the center of the upper wall of upper cover 12. It is preferable that camera 20 be a 35 mm camera which is provided with motor drive unit 22 to allow automatic advance of a film. Mount 26 for camera 20 is located at the end of lens-barrel 24, and annular mount 28 is located on the upper wall of upper cover 12. Each mount 26 or 28 is formed of a bayonet joint, so that camera 20 can be easily attached or detached from upper cover 12 by bayonet operation. As shown in FIG. 5, mount 26 for camera 20 is provided with pushing member 32 for holding focusing ring 30 of lens-barrel 24. Pushing member 32 serves to prevent focusing ring 30 from slipping from the right position when the image on screen 4 is photographed. More specifically, pushing member 32 includes arm 34 which is secured, at one end, to mount 26 by means of screws 36, and extends parallel to lens-barrel 24. Pushing pin 40, which is urged toward lens-barrel 24 by spring 38, is provided at that portion of pushing member 32 which faces focusing ring 30. The tip of pushing pin 40 touches the side surface of focusing ring 30, thus preventing focusing ring 30 from rotating. In this fashion, focusing ring 30 is held at the right position; it is prevented from slipping from the right position in spite of connection or disconnection of camera 20. Operating knob 42 is threadedly fitted into arm 34 such that it can be advanced or retreated with reference to focusing ring 30. The proximal portion of pushing pin 40 is received in operating knob 42 in a slidable manner. Pushing pin 40 is advanced or retreated from focusing ring 30 by turning operating knob 42.

As shown in FIG. 2, upper cover 12 is provided with a pair of pockets 50a and 50b. Each pocket 50a (50b) comprises storage chamber 54a (54b) and lid 56a (56b). Each storage chamber 54a (54b) has two openings located at the upper and side wall regions of upper cover 12, respectively Each storage chamber 54a (54b) is formed such that it has the maximum possible size, but should not affect the photography by camera 20. The lower end portion of each lid 56a (56b) is rotatably attached to upper cover 12 such that it can open or close the openings. A camera, a used film, and various camera accessories can be kept in storage chambers 54a and 54b.

The wiring of remote cable 52 for camera 20 will be described. First connector 58 is provided for the upper wall of upper cover 12, and second connector 60 is provided for the rear wall of upper cover 12. Two intermediate cables 62a and 62b, which connects first and second connectors 58 and 60 to each other, extend along the inner surface of upper cover 12. First connector 58 of upper cover 12 and motor drive unit 22 of camera 20 are connected to each other by means of attachment cables 64a and 64b of camera 20. Remote release cords 66a and 66b, which lead from the photography controller (or remote controller) of an image processing unit (not shown), are connected to second connector 60. With this wiring construction, it is possible to photograph the image on TV monitor 4 under remote control by using camera 20 fitted in upper cover 12. Incidentally, one intermediate cable 62 is connected also to photographic error-preventing mechanism 68, which is provided at the lower portion of the front wall of upper cover 12.

Figure 3:
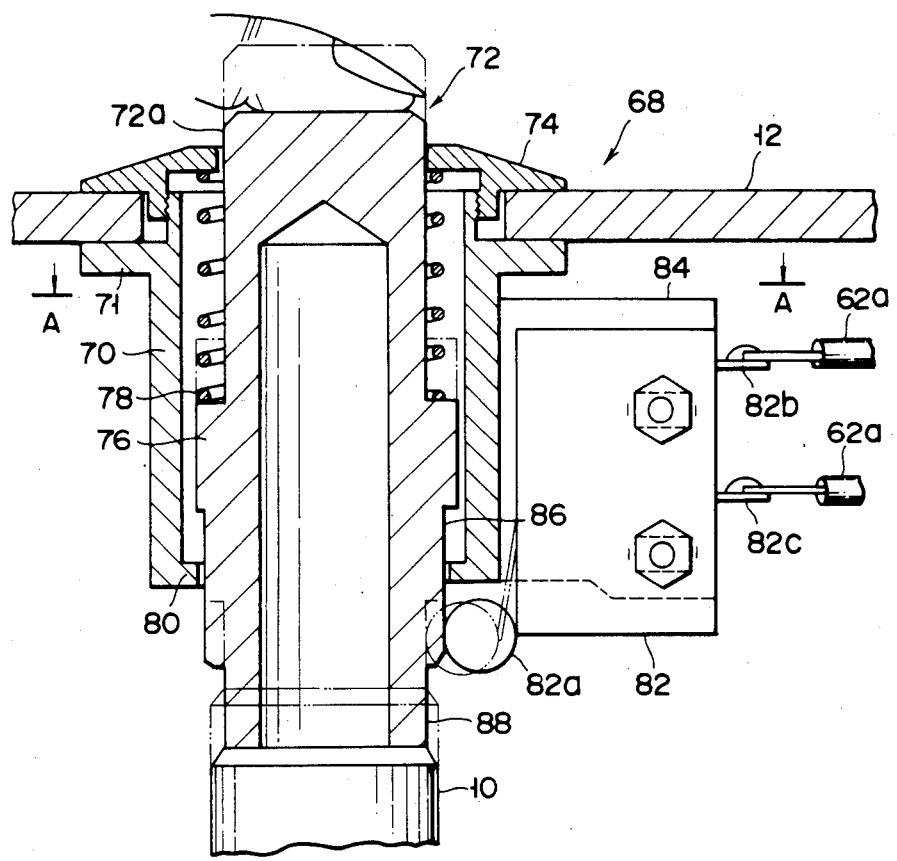
Figure 4:
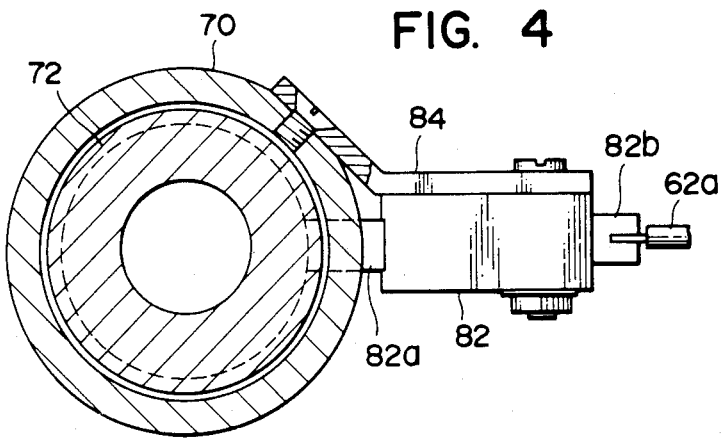

Next, a description may be made of error-preventing mechanism 68 used in the present invention, with reference to FIGS. 3 and 4. Guide pipe 70 is attached to the lower portion of the front wall of upper cover 12 such that it contacts the head portion of power switch 10. Cylindrical button member 72 is inserted into guide pipe 70. Flange member 74 is threadedly fitted around the upper end of guide pipe 70. Flange member 74 and flange portion 71 of guide pipe 70 are fastened to the opposite sides of the wall of upper cover 12. Button member 72 has first stepped portion 76 at its intermediate portion. Spring 78 is inserted between first stepped portion 76 and flange member 74. With this construction, button member 72 is urged toward power switch 10. When operation portion 72a of button member 72, which projects from upper cover 12, is depressed, power switch 10 is turned on, and button member 72 is held in the depressed condition. When operation portion 72a is depressed again, power switch 10 is turned off, and button switch 72 rises and is held in this condition. Stopper portion 80 is provided at the lower end of guide pipe 70. When button member 72 is lowered, first stepped portion 76 abuts stopper portion 80, thus limiting the movement of button member 72.

Microswitch 82 is attached to support plate 84 provided for guide pipe 70. Microswitch 82 includes actuator 82a, which is in contact with the circumference of guide pipe 70. Second and third stepped portions 86 and 88, which are different in outer diameter, are provided for that circumferential portion of button member 72 which faces actuator 82a. Due to the provision of these two stepped portions, microswitch 82 can be turned on or off in response to the on/off operation of power switch 10. Specifically, second stepped portion 86 has an outer diameter which is required for microswitch 82 to be turned on, and third stepped portion 88 has an outer diameter which is required for microswitch 82 to be turned off. Second stepped portion 86 is formed at that portion of button member 72 which actuator 82a contacts when power switch 10 is turned on, and similarly third stepped portion 88 is formed at that portion of button member 72 which actuator 82a contacts when power switch 10 is turned off. As described, microswitch 82 can be mechanically turned on or off due to the different outer diameters between second and third stepped portions 86 and 88.

Intermediate cables 62a is connected to terminals 82b and 82c of microswitch 82. Microswitch 82 functions as a sensor for detecting the on/off state of power switch 10. Only when TV monitor 4 is powered, intermediate cable 62a is supplied with electricity, rendering camera 20 operative.

With the above construction, when the image on TV monitor 4 is photographed, the plug is connected to the power supply receptacle, with lower and upper covers coupled to each other, and the signal line is connected to the image processing unit coupled to the endoscope. Remote release cords 66a and 66b are connected to the photography controller (or remote controller), and camera 20 is fitted into upper cover 12. Motor drive unit 22 of camera 20 and first connector 58 are connected to each other by attachment cables 64a and 64b. Therefore, the image detected by the solid-state image sensor is displayed on screen 6 of TV monitor 4 after being processed by the image processing unit. If the photography controller (or remote controller) is operated, the shutter button of camera 20 is depressed under remote control, thus photographing the image on screen 6.

In the case of a conventional monitor image-photographing apparatus, the shutter button of a camera is liable to be depressed even when a TV monitor is not powered.

However, the present invention is not faced with this problem. If TV monitor 4 is not powered, microswitch 82 is turned off, thus shutting the connection between the photography controller (or remote controller) and camera 20. Accordingly, the shutter button of camera 20 cannot be operated. In this fashion, camera 20 cannot be operated until TV monitor 4 is powered.

As described above, in the present invention, camera 20 is prevented from being operated while TV monitor 4 is off. It should be also noted that one can easily recognize the off state of the TV monitor if he finds the camera inoperative.

To observe the image on monitor 4, it is only necessary to remove upper cover 12 from lower cover 2.

Figure 6:
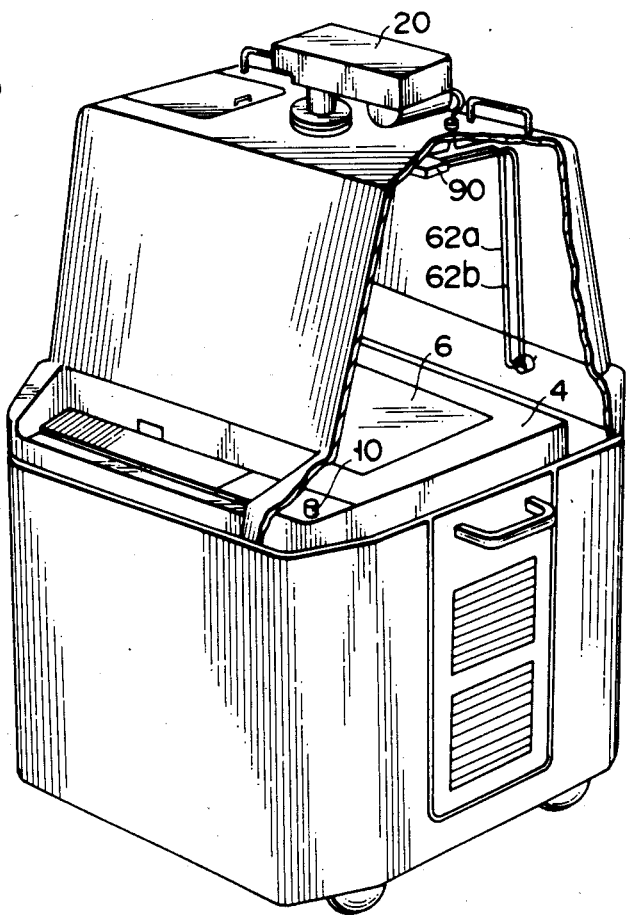
FIG. 6 is a partially-cutaway perspective view showing an image photography apparatus according to another embodiment of the present invention.
Figure 7:
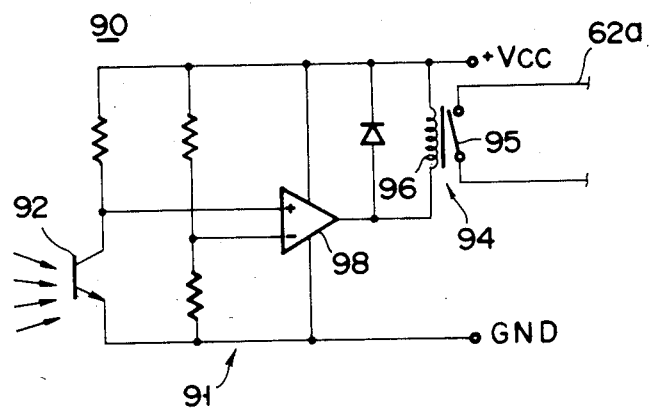
FIG. 7 shows the circuit configuration of the switch means of the image photography apparatus.

FIG. 6 shows another embodiment of the present invention. Error-preventing mechanism (switch means) 90 used in this alternative embodiment includes optical sensor 92 such as an SBC. By detecting the presence of light coming from screen 6 of TV monitor 4, it is possible to judge whether or not TV monitor 4 is powered. Based on this judgment, relay switch 94, which is provided for one of intermediate cables 62a and 62b connected to camera 20, is opened or closed. In practice, electric circuit 91 shown in FIG. 7 is used. Optical sensor 92 is located above screen 6 of TV monitor 4, and contact 95 of relay switch 94, which includes electromagnetic coil 96 and is of a normally-closed type, is inserted in intermediate cable 62a. Electromagnetic coil 96 and optical sensor 92 are connected to each other with comparator 98 located therebetween. Therefore, when optical sensor 92 does not detect any light coming from screen 6, current is supplied to electromagnetic coil 96 in response to a high electric potential difference detected by comparator 98. As a result, contact 95 is opened. When optical sensor 92 detects light coming from screen 6, the supply of current to electromagnetic coil 96 is stopped in response to a low electric potential difference detected by comparator 98. As a result, contact 95 is closed. With this construction, a photographical error can be prevented from occurring, as in the first embodiment.

Figure 8:
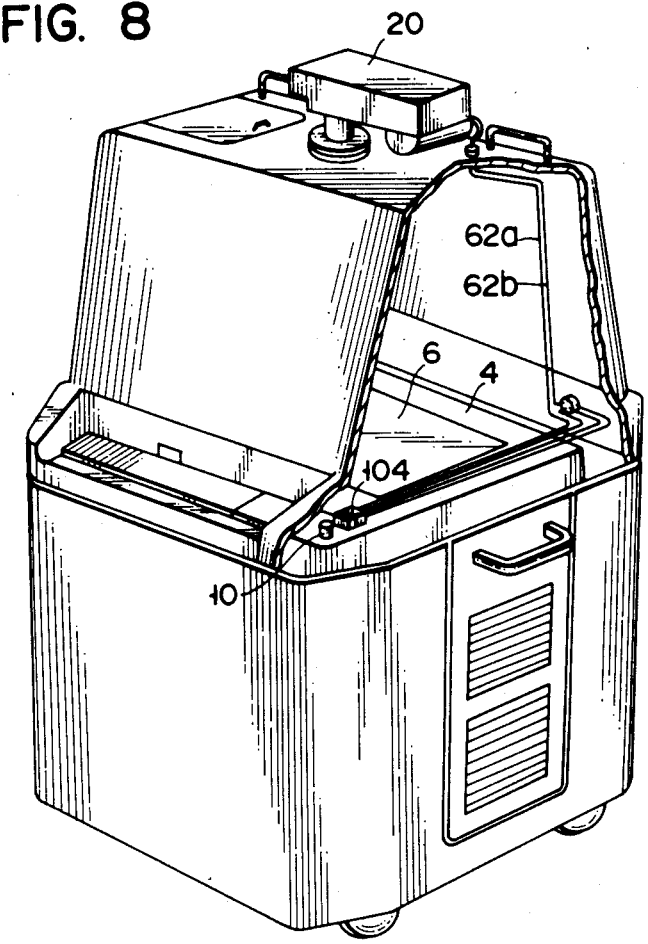
FIG. 8 is a partially-cutaway perspective view showing the image photography apparatus which uses a switch means of the first modification.
Figure 9:
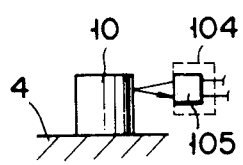
FIGS. 9 and 10 are side views of the switch means according to the, first modification.
Figure 10:
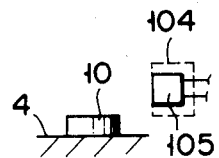

FIGS. 8–10 illustrate the first modification of the switch means. In this modification, switch means 104 uses a photo reflector type optical sensor 105 in place of optical sensor 92. The photo reflector type optical sensor 105 is located in the neighborhood of power switch 10, and detects the height of power switch 10 changed by on/off operation of switch 10, thus judging whether or not TV monitor 4 is powered. Contact 95 of relay switch 94 of electric circuit 91 is opened or closed based on the height detected.

Figure 11:
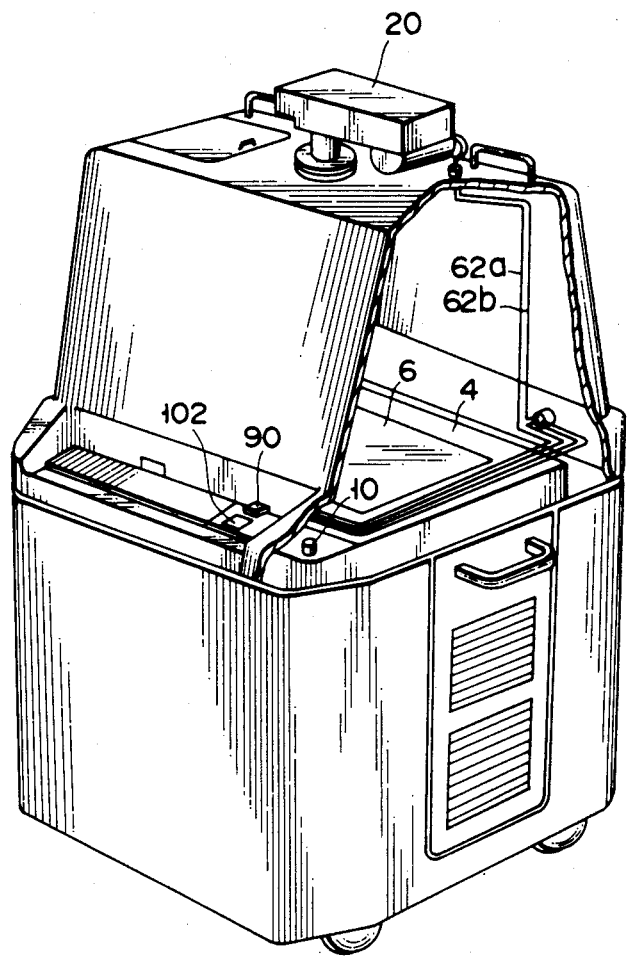
FIG. 11 is a partially-cutaway perspective view of the image photography apparatus which uses a switch means of the second modification.

FIG. 11 illustrates the second modification of the switch means. In this modification, TV monitor 4 is provided with pilot lamp 102, which indicates that the TV monitor is on. Switch means 90 having optical sensor 92 is provided in the neighborhood of pilot lamp 102. Optical sensor 92 detects whether pilot lamp 102 is turned on or off, thereby judging whether TV monitor 4 is turned on or off. Based on this judgment, contact 95 of relay switch 94 of electric circuit 91 is opened or closed.

Figure 12:
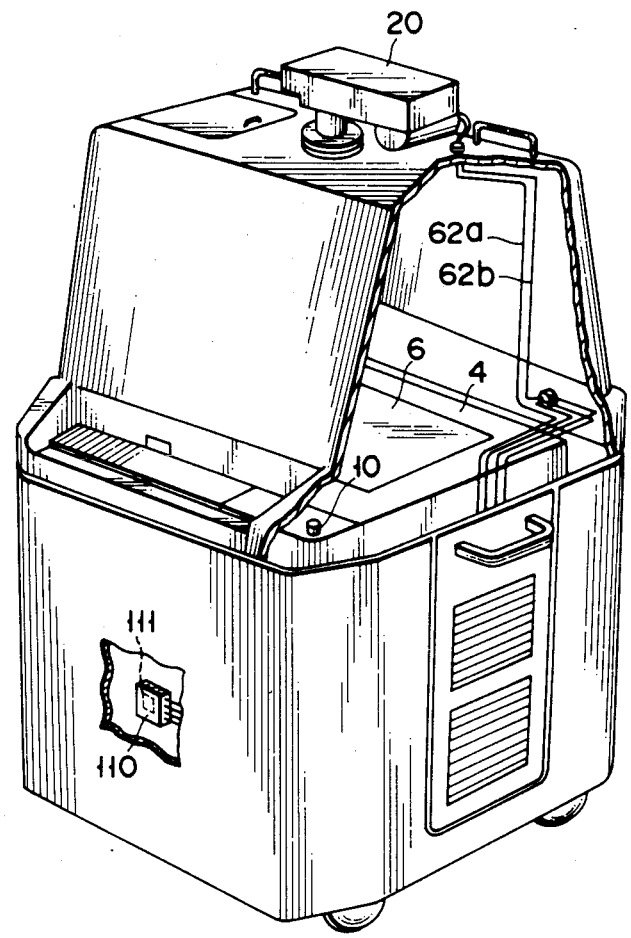
FIG. 12 is a partially-cutaway perspective view of the image photography apparatus which uses a switch means of the third modification.

FIG. 12 illustrates the third modification of the switch means. In this modification, switch means 110 uses a magnetic sensor 111 instead of optical sensor 92. The magnetic sensor 111 detects whether power switch 10 is on or off, based on the presence or absence of a magnetic field generated by screen 6. Based on the detection, contact 95 of relay switch 94 of electric circuit 91 is on/off controlled.

As detailed above, the monitor image photography apparatus of the present invention permits a camera to be operated only when the power switch of the TV monitor is on. While the power switch is off, the camera is rendered inoperative. Therefore, a photographical error is prevented from occurring when the TV monitor is off.

What is claimed is:

1. An image photography apparatus for photographing from a TV monitor, comprising:
    a casing which is shaped substantially like a box;
    a TV monitor received in the casing;
    a power supply source for the TV monitor;
    camera means detachably coupled to the casing for photographing an image displayed on the TV monitor, said camera means having a power source which is separate from the power source for the TV monitor, and a pair of remote control cables for actuating said camera means by remote control for causing remote controlled photographing of the image on the TV monitor; and
    switch means, including a switch contact electrically inserted in series with one of the remote control cables, said switch means including means for opening/closing the switch contact in response to on/off operation of the power supply source of the TV monitor.

2. An image photography apparatus according to claim 1, wherein the power supply source for the Tv monitor includes a push-button power switch, and the opening/closing means of the switch means includes:
    a button member located on the push-button power switch and having a plurality of stepped portions; and
    a microswitch having an actuator driven by the stepped portions.

3. An image photography apparatus according to claim 1, wherein the switch means includes:

sensor means for detecting physical changes caused by the on/off operation of the power supply source of the TV monitor; and electric circuit means for opening/closing the switch contact in response to an electric signal produced by the sensor means.

4. An image photography apparatus according to claim 3, wherein the sensor means includes an optical sensor for detecting changes in light generated by the TV monitor.

5. An image photography apparatus according to claim 3, wherein the TV monitor includes a push-button power switch, and the sensor means includes a photo reflector type sensor for detecting the height of the power switch changed by the on/off operation of the power switch.

6. An image photography apparatus according to claim 3, wherein the TV monitor includes a pilot lamp for indicating the on/off state of the power supply, and the sensor means includes an optical sensor for detecting changes in light emitted from the pilot lamp.

7. An image photography apparatus according to claim 3, wherein the sensor means includes a magnetic sensor for detecting the presence or absence of a magnetic field generated by the TV monitor.

8. An image photography apparatus according to claim 1, wherein the casing includes upper and lower covers which are shaped substantially like a box and which are separable from each other.

9. An image photography apparatus according to claim 8, wherein the upper cover comprises two storage chambers.

10. An image photography apparatus according to claim 9, wherein:

the upper cover includes an annular mount which is located on an upper portion of the upper cover and to which the camera means is detachably coupled;

the camera means includes a focusing ring and a mount located at the end of the focusing ring; and the mount of the camera means and the annular mount of the upper cover comprising a mutually engageable bayonet joint.

11. An image photography apparatus according to claim 10, wherein the mount of the camera means comprises a pushing member preventing the focusing ring from slipping.

12. An image photography apparatus according to claim 1, wherein said switch means comprises a single switch contact connected in series with only one of said remote control cables.

13. An image photography apparatus according to claim 1, wherein said switch means comprises a single switch contact.

* * * * *